US012572278B2

(12) United States Patent
Park

(10) Patent No.: US 12,572,278 B2
(45) Date of Patent: Mar. 10, 2026

(54) STORAGE DEVICE GROUPING A PLURALITY OF ZONES INTO ZONE CLUSTER, SYSTEM AND OPERATING METHOD OF THE STORAGE DEVICE

(71) Applicant: SK hynix Inc., Icheon-si (KR)

(72) Inventor: In Hyuk Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 35 days.

(21) Appl. No.: 18/450,976

(22) Filed: Aug. 16, 2023

(65) Prior Publication Data

US 2024/0338123 A1      Oct. 10, 2024

(30) Foreign Application Priority Data

Apr. 6, 2023      (KR) ......................... 10-2023-0045253

(51) Int. Cl.
G06F 3/06 (2006.01)

(52) U.S. Cl.
CPC ............ G06F 3/061 (2013.01); G06F 3/0644 (2013.01); G06F 3/0658 (2013.01); G06F 3/0673 (2013.01)

(58) Field of Classification Search
CPC ...... G06F 3/061; G06F 3/0644; G06F 3/0658; G06F 3/0673
See application file for complete search history.

(56) References Cited

U.S. PATENT DOCUMENTS

| 7,441,067 B2 * | 10/2008 | Gorobets ............ G06F 12/0246 |
| | | 365/185.24 |
| 8,762,625 B2 * | 6/2014 | Post ...................... G06F 3/0679 |
| | | 711/103 |
| 10,860,219 B2 * | 12/2020 | Zhu ...................... G06F 12/0246 |
| 2007/0208904 A1 * | 9/2007 | Hsieh ................. G11C 16/3495 |
| | | 711/E12.008 |
| 2010/0318719 A1 * | 12/2010 | Keays ................. G06F 12/0246 |
| | | 711/E12.001 |
| 2013/0054869 A1 * | 2/2013 | Tolia ....................... G06F 16/00 |
| | | 711/E12.007 |
| 2016/0259570 A1 | 9/2016 | Agarwal et al. |
| 2019/0146705 A1 * | 5/2019 | Lin ........................ G06F 3/0659 |
| | | 711/103 |

FOREIGN PATENT DOCUMENTS

KR      1020160103811 A      9/2016

* cited by examiner

*Primary Examiner* — Gautam Sain
*Assistant Examiner* — Chen Gu
(74) *Attorney, Agent, or Firm* — WILLIAM PARK AND ASSOCIATES LTD.

(57) ABSTRACT

A storage device may group a plurality of zone clusters, each cluster including at least one zone. The storage device may then store target data in a target zone cluster. For example, the storage device may determine a target zone for storing target data, using the sum of a write count and a seed value for the target zone cluster.

18 Claims, 11 Drawing Sheets

(index of TGT_ZONE) = f(WC, SD)

Group a plurality of zone clusters — S1010

Select target zone cluster among plurality of zone clusters — S1020

Store target data in target zone cluster — S1030

STORAGE DEVICE GROUPING A PLURALITY OF ZONES INTO ZONE CLUSTER, SYSTEM AND OPERATING METHOD OF THE STORAGE DEVICE

CROSS-REFERENCE TO RELATED APPLICATION

The present application claims priority under 35 U.S.C. 119 (a) to Korean patent application number 10-2023-0045253 filed on Apr. 6, 2023, in the Korean Intellectual Property Office, which is incorporated herein by reference in its entirety.

TECHNICAL FIELD

The embodiments of the present disclosure relate to a storage device and a system grouping a plurality of zones into a zone cluster, and an operating method of the storage device.

BACKGROUND

A storage device is a device for storing data based on a request from an external device such as a computer, a mobile terminal such as a smart phone or tablet, or various electronic devices.

The storage device may further include a controller for controlling memory (e.g. volatile memory/non-volatile memory). The controller may receive a command from an external device, and execute or control operations to read, write, or erase data in the memory included in the storage device based on the input command.

Meanwhile, a memory may be divided into a plurality of zones. In this case, if data is intensively written in some of the zones, the storage device performance may be degraded.

SUMMARY

Embodiments of the disclosure may provide a storage device, which is capable of writing data to a plurality of zones more efficiently. Embodiments also may provide a system and an operating method thereof.

One embodiment may provide a storage device including i) a memory comprising a plurality of zones, and ii) a controller configured to group a plurality of zone clusters, each zone cluster comprising at least one zone of the plurality of zones, and store target data in a target zone cluster which is selected by the controller from the plurality of zone clusters.

Another embodiment may provide a method of operating a storage device comprising a plurality of zones, the method including i) grouping a plurality of zone clusters each including at least one of the plurality of zones, ii) selecting a target zone cluster from the plurality of zone clusters, and iii) storing target data in the selected target zone cluster.

Yet another embodiment may provide a system including i) a storage device including a plurality of zones, and ii) a host coupled to the storage device and being configured to control the storage of target data in the storage device. In this case, the target data may include a plurality of data units, and each data unit may include a key-value pair. The storage device may group a plurality of zone clusters each zone cluster including one or more zones, and which store the target data in a target zone cluster.

According to embodiments of the present disclosure, it is possible to write data to a plurality of zones more efficiently.

DETAILED DESCRIPTION

Figure 1:
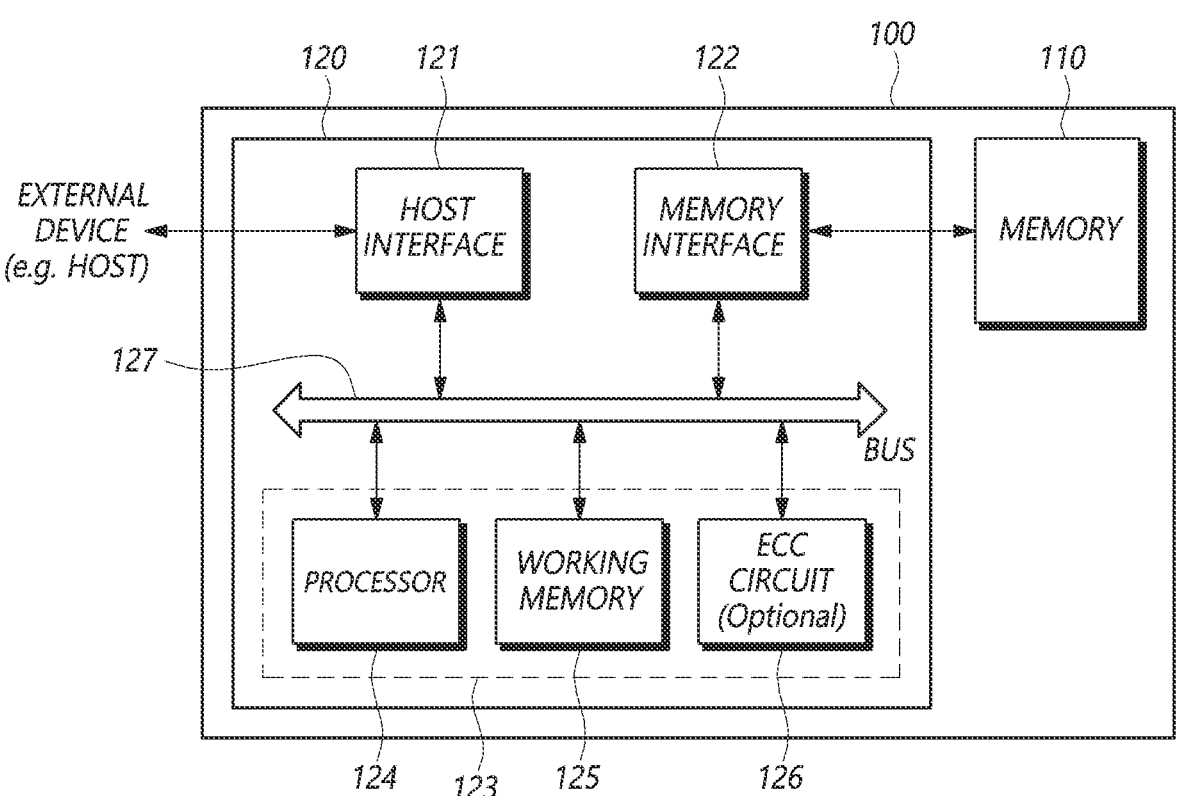
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

As used herein, a random seed or just seed, is a number, which initializes a pseudorandom number generator. Randomization is a process of making something random. The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
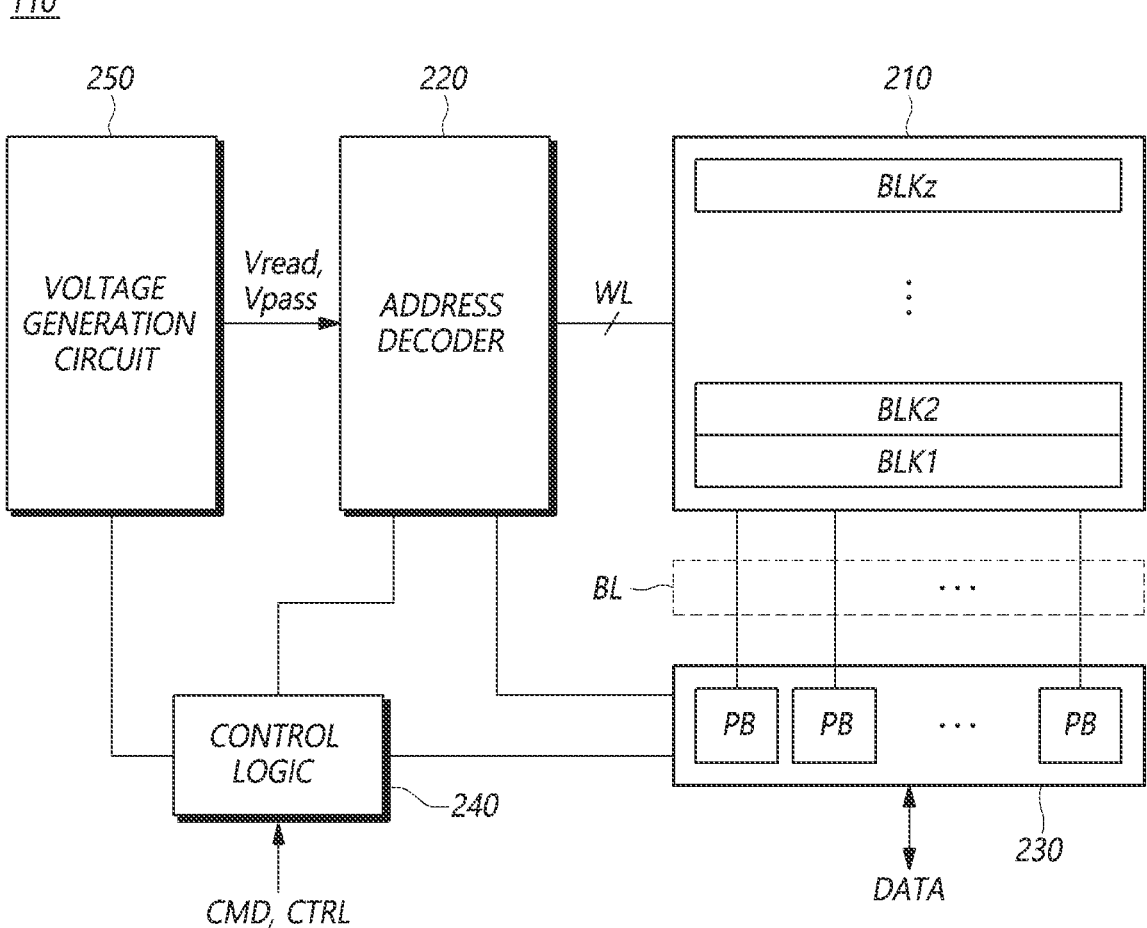
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
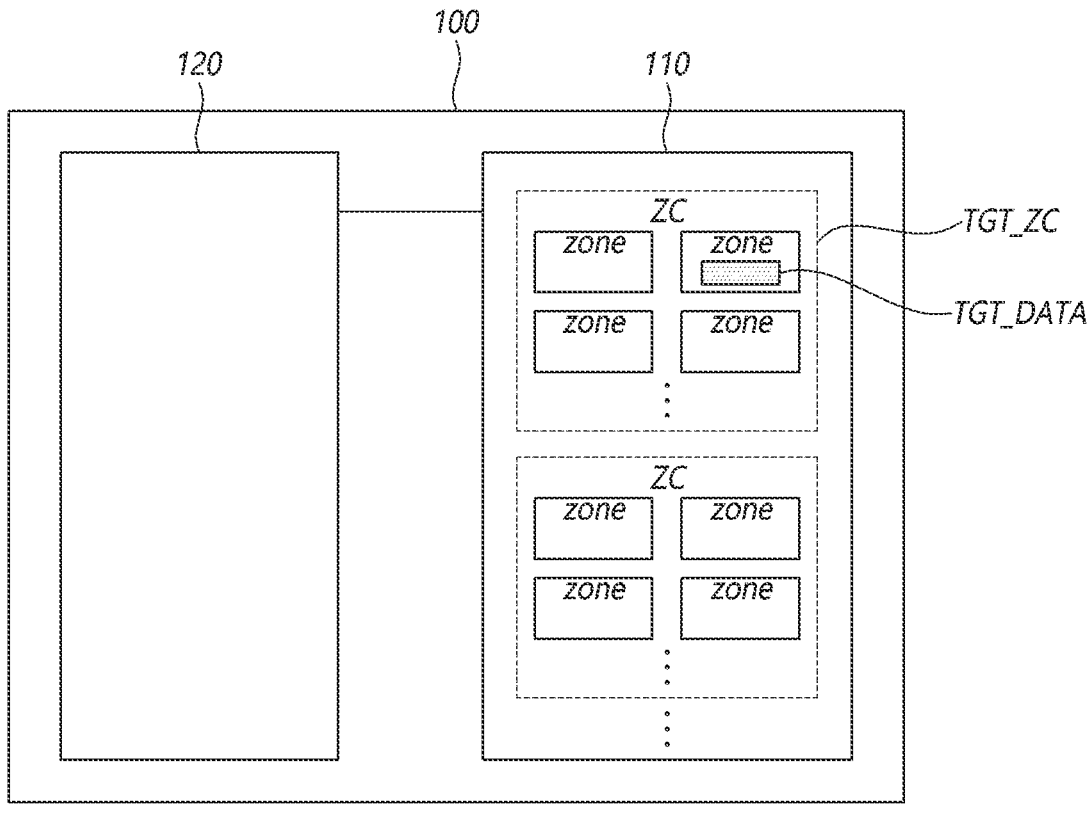
FIG. 3 illustrates a schematic structure of a storage device according to embodiments of the present disclosure.

FIG. 3 illustrates a schematic structure of a storage device 100 according to an embodiment of this disclosure. And, as described above, the storage device 100 may include a memory 110 and a controller 120.

The memory 110 may be arranged as having a plurality of zones, each zone being one or more memory blocks or in another embodiment, one or more memory pages. Each zone may store data.

The memory 110 may be configured such that data may be "appended" into a zone, such that subsequent data write operations into an appending zone cannot be executed until after an in-progress data write operation is completed or terminated.

The controller 120 may group zone clusters ZC, which are groups of zones.

The number of zones in each zone cluster of a plurality of zone clusters ZC may be the same (e.g., 32). The storage capacity of each zone in the same zone cluster may be the same.

As used herein, the target data TGT_DATA may refer to either general user data or meta data, which may be may be data in a special format. In an embodiment, the controller 120 may control the memory 110 to store target data TGT_DATA, in a target zone cluster TGT_ZC, selected from a plurality of zone clusters ZC.

Figure 4:
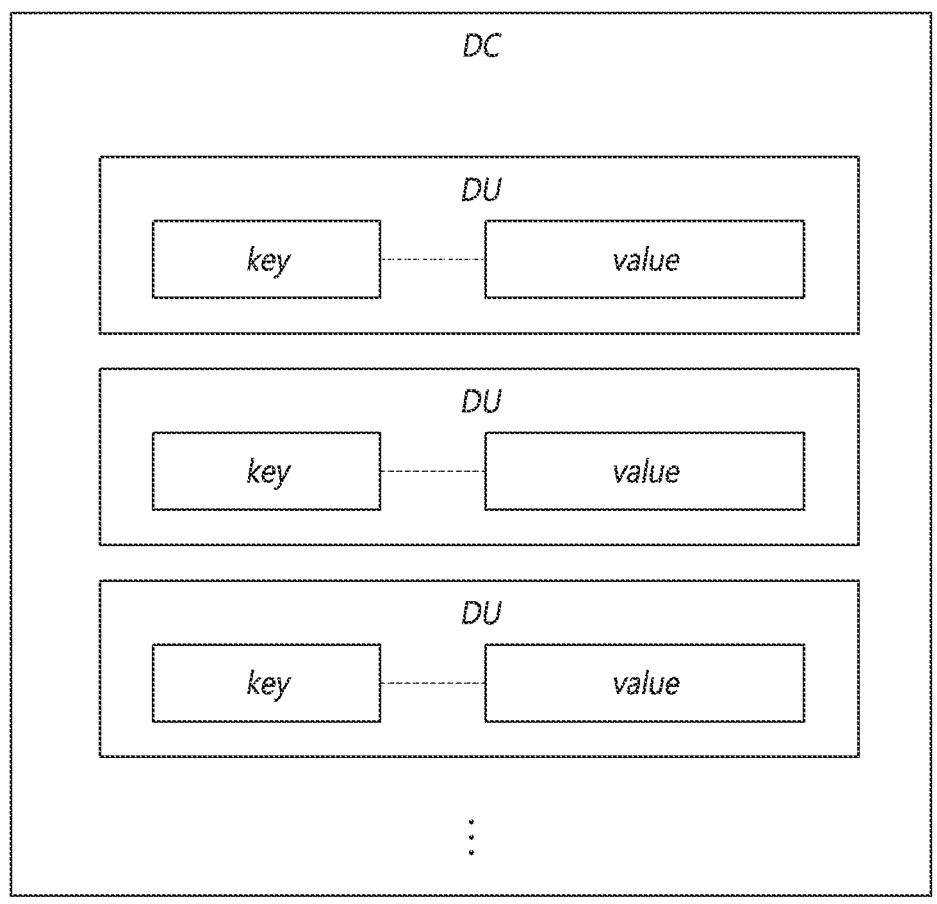
FIG. 4 illustrates an example of a structure of a data chunk according to embodiments of the present disclosure.

In some embodiments, target data TGT_DATA may occupy all or part of a data chunk DC, an arrangement of which is depicted in FIG. 4 and described hereinafter.

FIG. 4 illustrates a data chunk DC exemplar according to embodiments of the present disclosure.

Target data TGT_DATA may occupy all or part of the data chunk DC, which includes a plurality of data units DU. In FIG. 4, each data unit DU may include a "key" and an associated value, corresponding to the associated key.

The target data TGT_DATA may be one or more data units DU. The target data TGT_DATA may thus comprise one or more keys, each key being associated within or "included" in an associated data unit. The target data TGT_DATA may thus be one or more values, each of which is associated with or identified by a key, the keys and values being included in each data unit DU.

A data chunk DC may be provided to the storage device 100 by a host located outside and separate from the storage device 100. To implement a key-value store, a host may form or constitute data units DU based on a key and a value corresponding to the key. The host may then store in the storage device 100, a data chunk DC, which as FIG. 4 shows, includes a plurality of data units DU. The host may thereafter transmit to the storage device 100, a read request that includes the key and obtain back from the storage device 100, a value corresponding to the key.

In embodiments of the present disclosure, when storing the target data TGT_DATA in a target zone cluster TGT_ZC, the controller 120 of the storage device 100 may store target data TGT_DATA in a specific zone included in the target zone cluster TGT_ZC.

Figure 5:
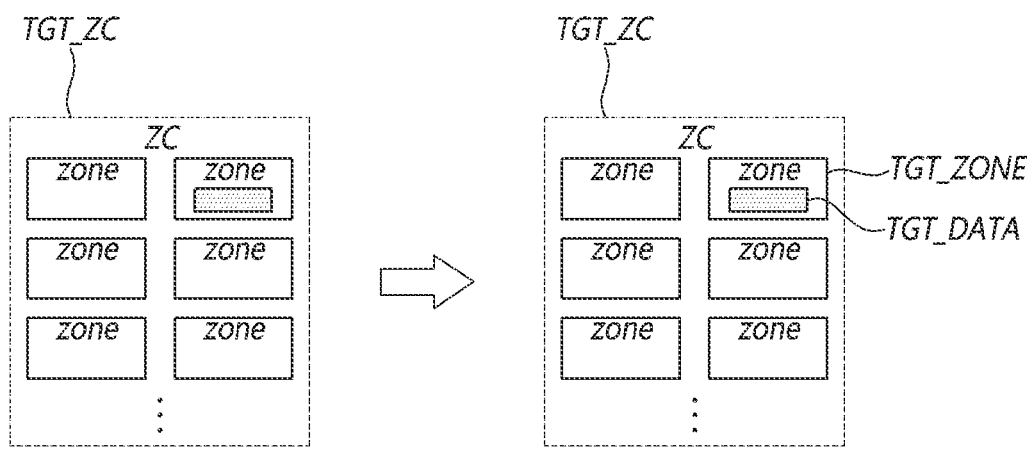
FIG. 5 illustrates an example of an operation of determining a target zone in a target zone cluster by a storage device according to embodiments of the present disclosure.

FIG. 5 illustrates the determination of a target zone TGT_ZONE, in a target zone cluster TGT_ZC by a storage device 100.

In FIG. 5, the storage device 100 controller 120 may determine a target zone TGT_ZONE in which the target data TGT_DATA is to be stored, based on a write count WC and a seed value SD for the target zone cluster TGT_ZC. A seed value SD may be generated by the controller 120 as a random number when the controller 120 groups the target zone cluster TGT_ZC.

The write count WC for the target zone cluster TGT_ZC may be changed when data is written to the target zone cluster TGT_ZC. Accordingly, the target zone TGT_ZONE may be dynamically changed as data is being written to the target zone cluster TGT_ZC.

Since a target zone TGT_ZONE may be changed as data is written into it, data to be stored may be distributed, i.e., stored in different zones that comprise the target zone cluster TGT_ZC.

Accordingly, storage device 100 performance degradation caused by centralized data storage in only a specific zone of the target zone cluster TGT_ZC, may be reduced or eliminated. Data may be stored more efficiently in zones by evenly using zones in a target zone cluster TGT_ZC. The controller 120 may also improve data read performance by reading data distributed in zones of a target zone cluster TGT_ZC in an interleaving manner.

In embodiments of the present disclosure, the controller 120 may determine the target zone TGT_ZONE based on factors that include write count WC and the seed value SD of the target zone cluster TGT_ZC. For example, the controller 120 may determine the target zone TGT_ZC based on a remainder obtained by dividing the sum of the write count WC and the seed value SD by the number of zones included in the target zone cluster TGT_ZC.

In such a case, if the number of zones included in the target zone cluster TGT_ZC is 32, an index of the target zone TGT_ZC may be determined as ((WC+SD) % 32).

Figure 6:
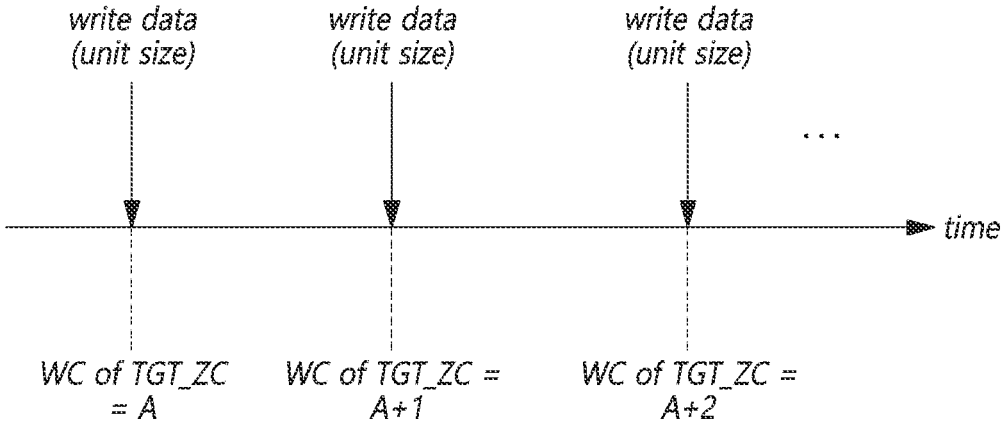
FIG. 6 illustrates an example of an operation of changing a write count of a target zone cluster by a storage device according to embodiments of the present disclosure.

FIG. 6 illustrates changing a write count WC of a target zone cluster TGT_ZC by a storage device 100 according to embodiments of the present disclosure.

In FIG. 6, the write count WC of the target zone cluster TGT_ZC may increase whenever data having a specific unit size (e.g., 192 KB) is written to the target zone cluster TGT_ZC. That is, in order to increase the write count WC of the target zone cluster TGT_ZC, data larger than a unit size is required to be written to the target zone cluster TGT_ZC. When the data of the unit size is written in the target zone cluster TGT_ZC, a write count WC is A. Thereafter, when data of the unit size is additionally written to the target zone cluster TGT_ZC, the write count WC may increase to A+1.

Then, when data of the unit size is additionally written to the target zone cluster TGT_ZC, the write count WC may increase to A+2.

Hereinafter, writing target data TGT_DATA to the target zone TGT_ZONE after the controller 120 of the storage device 100 determines the target zone TGT_ZONE is described with reference to FIG. 7.

Figure 7:
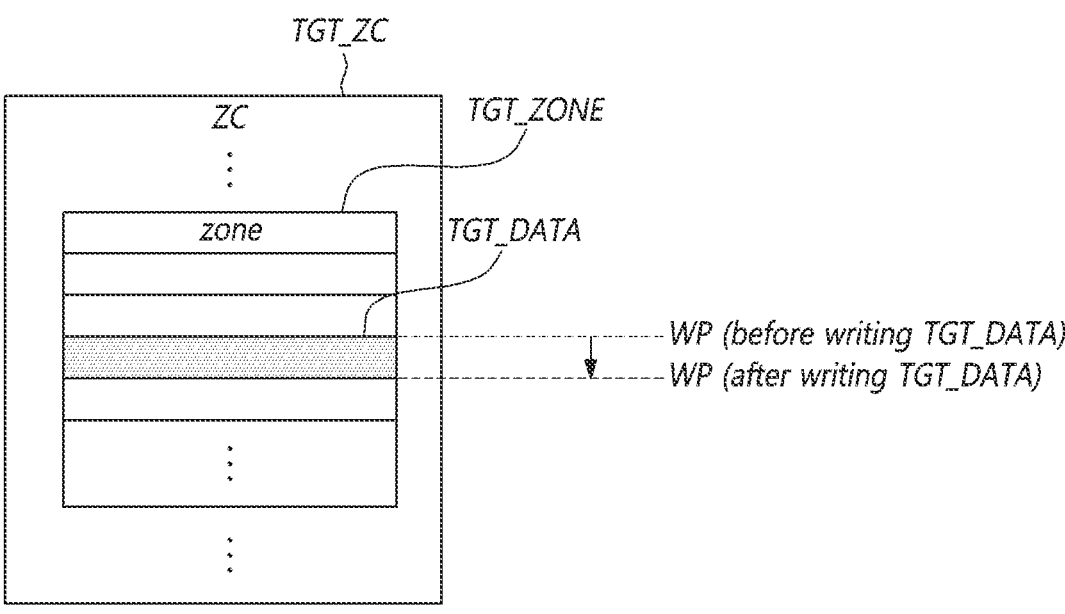
FIG. 7 illustrates an example of an operation of changing a write pointer of a target zone by a storage device according to embodiments of the present disclosure.

FIG. 7 illustrates changing a write pointer WP of a target zone TGT_ZONE by a storage device 100 according to embodiments of the present disclosure.

The controller 120 of the storage device 100 may write target data TGT_DATA to a location indicated by a write pointer WP corresponding to the target zone TGT_ZONE.

In embodiments of the present disclosure, a write pointer may exist for each of the zones included in the target zone cluster TGT_ZC. In addition, the write pointer of each zone may indicate a position or a location where data to be written in the corresponding zone is written.

In FIG. 7, the controller 120 may write the target data TGT_DATA at a location indicated by the write pointer WP corresponding to the target zone TGT_ZONE. In addition, the controller 120 may increase a write pointer WP by the size of the target data TGT_DATA. That is, the write pointer WP corresponding to the target zone TGT_ZONE may sequentially increase whenever data is written in the target zone TGT_ZONE.

Figure 8:
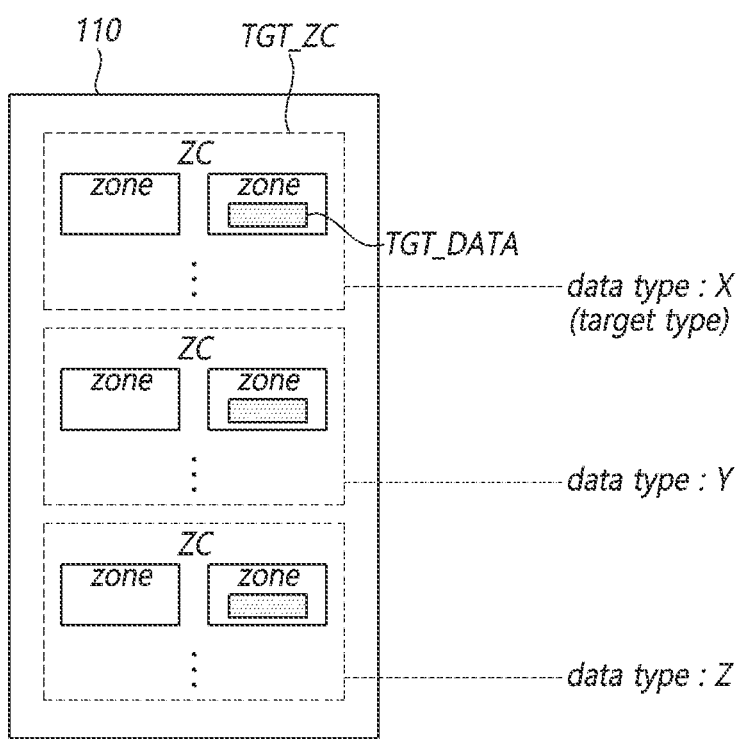
FIG. 8 illustrates data types corresponding to each of a plurality of zone clusters according to embodiments of the present disclosure.

FIG. 8 shows that different data types can be stored in correspondingly different zones of a zone cluster ZC, according to embodiments of the present disclosure. The controller 120 of the storage device 100 may "set" or control each zone cluster ZC, such that each zone cluster of a plurality of zone clusters ZC stores a particular type of data.

In FIG. 8, a plurality of zone clusters ZC may store data of data types X, Y, and Z, respectively. That is, each zone cluster may store data of a specific type of a plurality of different data types.

In FIG. 8, the target zone cluster TGT_ZC may store type X data. Accordingly, the target data TGT_DATA may be data of target type X.

Data target type may be determined in various ways. For example, the target type may be selected from among a first type indicating an index including a key, a second type indicating supplementary index information for the index, and a third type indicating a value corresponding to the key.

Figure 9:
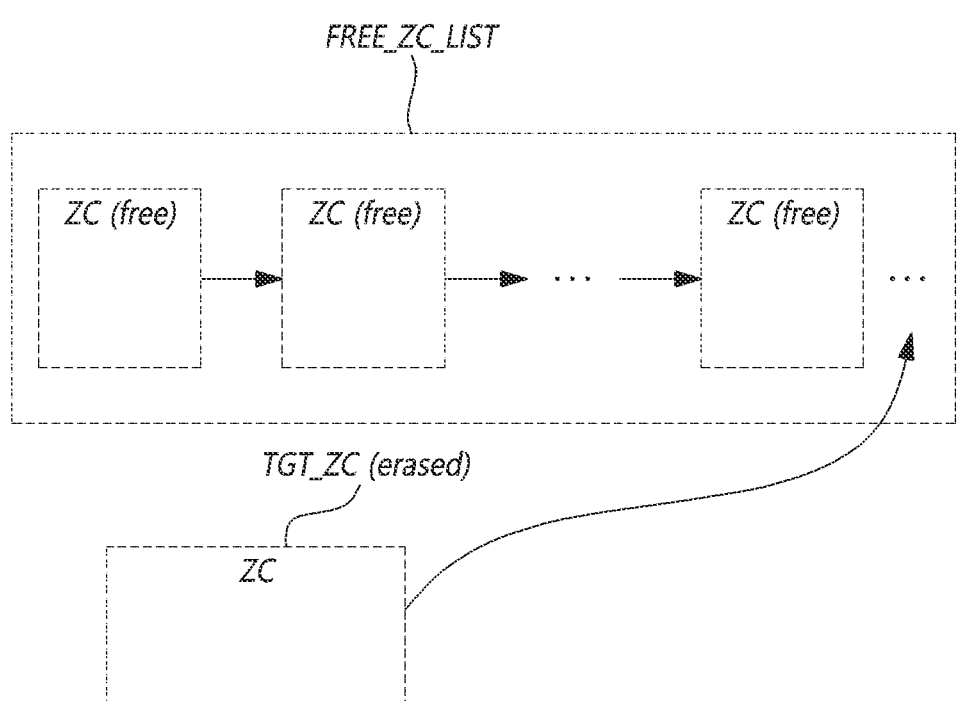
FIG. 9 illustrates an example of an operation of managing a list of free zone clusters by a storage device according to embodiments of the present disclosure.

FIG. 9 illustrates managing a list of free zone clusters FREE_ZC_LIST, i.e., a managing free or unused zone clusters, by a storage device 100 according to embodiments of the present disclosure.

In FIG. 9, the controller 120 of the storage device 100 may create or set a list of free zone clusters FREE_ZC_LIST from among a plurality of zone clusters ZC. The controller 120 may allocate a zone cluster for storing data to one of the free zone clusters included in the list of free zone clusters FREE_ZC_LIST.

The free zone cluster may be an erased zone cluster. That a zone cluster is in an erased state may mean that all zones included in the zone cluster are erased so that no data is stored in any zone. New data can therefore be stored in any erased-state zone.

In FIG. 9, the controller 120 of the storage device 100 may set the target zone cluster TGT_ZC as a free zone cluster by executing an erase operation on the target zone cluster TGT_ZC. In the case that data stored in the target zone cluster TGT_ZC is no longer utilized, the controller 120 may execute an erase operation on the target zone cluster TGT_ZC.

After executing the erase operation on the target zone cluster TGT_ZC, the controller 120 may add the target zone cluster TGT_ZC to the list of free zone clusters FREE_Z-C_LIST. Then, the target zone cluster TGT_ZC may be allocated again to store other types of data.

Figure 10:
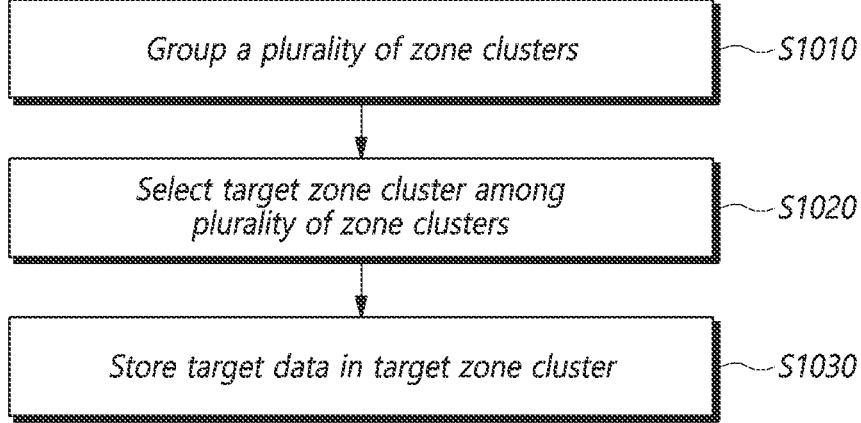
FIG. 10 illustrates an operating method of a storage device according to embodiments of the present disclosure.

FIG. 10 illustrates method of operating a storage device 100 according to embodiments of the present disclosure.

Referring to FIG. 10, the operating method may include grouping a plurality of zone clusters ZC each zone cluster ZC including at least one zone (S1010), selecting a target zone cluster TGT_ZC from the plurality of zone clusters ZC (S1020), and storing the target data TGT_DATA in the target zone cluster TGT_ZC (S1030).

For example, the target data TGT_DATA may be all or part of a data chunk DC including a plurality of data units DU. In such a case, each of the plurality of data units DU may include a key and a value corresponding to the key.

For example, step S1030 may include i) determining the target zone TGT_ZONE for storing the target data TGT-_DATA among zones included in the target zone cluster TGT_ZC based on a write count WC and seed value SD of the target zone cluster TGT_ZC, and ii) storing the target data TGT_DATA in the target zone TGT_ZONE.

In such a case, the write count WC may increase whenever data having a preset unit size is written to the target zone cluster TGT_ZC.

In the step of determining the target zone TGT_ZONE, S1020, the target zone may be determined by a reminder obtained by dividing the sum of the write count WC plus the seed value SD, by the number of zones included in the target zone cluster TGT_ZC.

The step of determining the target zone TGT_ZONE may include writing the target data TGT_DATA at a location indicated by the write pointer WP corresponding to the target zone TGT_ZONE.

For example, the target data TGT_DATA may be data of a target type which is one of a plurality of data types.

Meanwhile, the operating method of the storage device 100 may further include i) executing an erase operation on a target zone cluster TGT_ZC, and ii) adding the target zone cluster TGT_ZC to a list of free zone clusters FREE_Z-C_LIST after executing the erase operation on the target zone cluster TGT_ZC.

Figure 11:
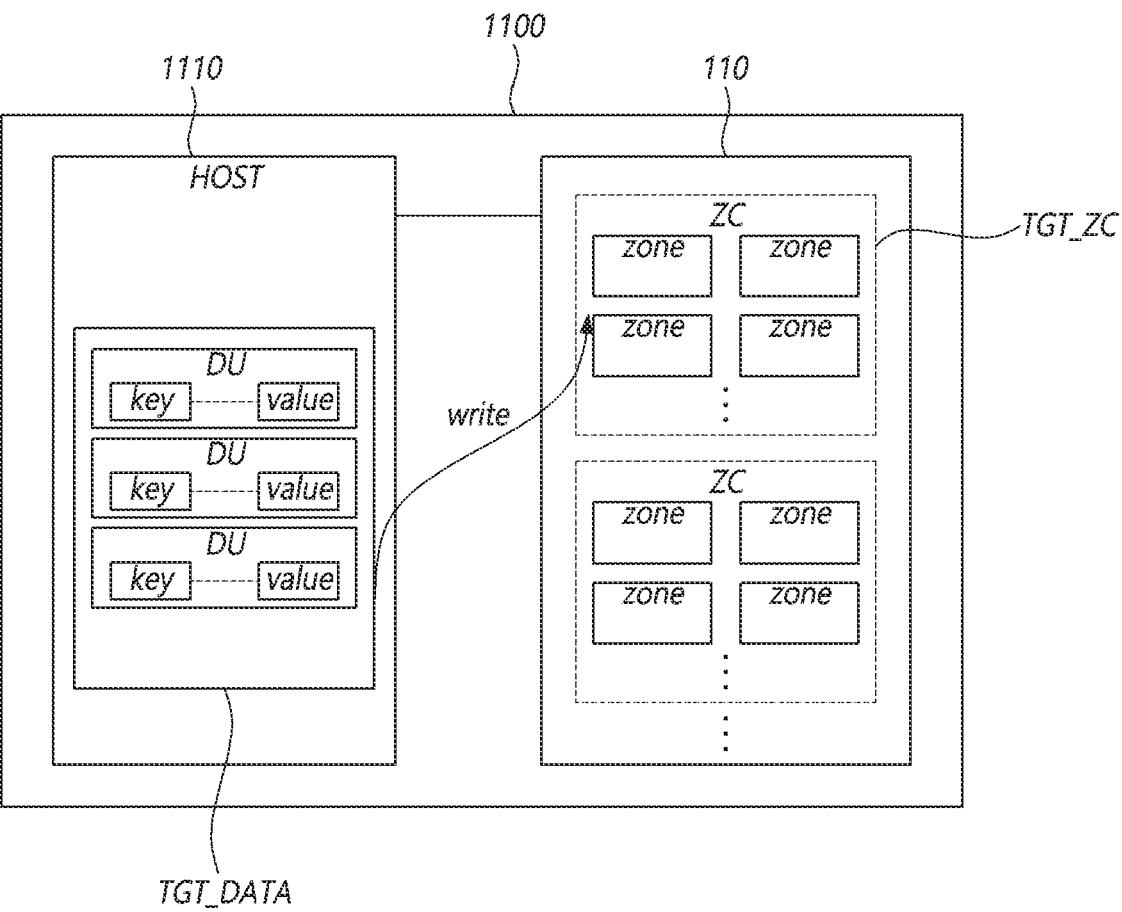
FIG. 11 illustrates a schematic structure of a system according to embodiments of the present disclosure.

FIG. 11 illustrates a system 1100 according to embodiments of the present disclosure.

The system 1100 may include a host 1110 and a storage device 100. As described with reference to FIG. 3, the storage device 100 may include a plurality of zones therein.

The host 1110 may request the storage device 100 to store the target data TGT_DATA. In this case, the target data TGT_DATA may include a plurality of data units DU.

Each of the plurality of data units DU may include a key-value pair. A value included in each data unit may be identified by a corresponding key. The host 1110 may transmit a read request including a specific key to the storage device 100 after storing the target data TGT_DATA in the storage device 100. In this case, the storage device 100 may identify a value corresponding to the corresponding key and transmit the value to the host 1110. Accordingly, the host 1110 may implement a key-value store.

The storage device 100 may group a plurality of zone clusters ZC each including one or more of the plurality of zones. In addition, when the host 1110 requests the storage device 100 to store the target data TGT_DATA, the storage device 100 may store the target data TGT_DATA in a target zone cluster TGT_ZC among a plurality of zone clusters ZC.

In this case, as described above, the storage device 100 may determine, based on a write count and seed value for the target zone cluster TGT_ZC, a target zone in which the target data TGT_DATA is to be stored among zones included in the target zone cluster TGT_ZC. For example, the storage device 100 may determine the target zone based on a remainder obtained by dividing the sum of the write count and the seed value by the number of zones included in the target zone cluster TGT_ZC.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory comprising a plurality of zones; and
a controller configured to group the plurality of zones into a plurality of zone clusters, configured to determine a seed value for the each of the plurality of zone clusters as a random value at a time the plurality of zone clusters is grouped, configured to determine a target zone among zones included in a target zone cluster among the plurality of zone clusters based on a write count for the target zone cluster and the seed value for the target zone cluster and configured to store target data in the target zone.

2. The storage device of claim 1, wherein the controller is configured to store the target data in the target zone cluster as a part of a data chunk, the data chunk comprising at least one data unit;
wherein each data unit comprises a key and a value corresponding to the key.

3. The storage device of claim 1, wherein the controller is configured to increment the write count when data of a unit size is written to the target zone cluster.

4. The storage device of claim 1, wherein the controller is configured to determine the target zone from a remainder of a sum of the write count and the seed value divided by a number of zones in the target zone cluster.

5. The storage device of claim 1, wherein the controller is configured to write the target data into a location of the target zone identified by a write pointer.

6. The storage device of claim 1, wherein the target data comprises a plurality of different data types.

7. The storage device of claim 6, wherein a target data type of the plurality of different data types is one of: a first type indicating an index including a key; a second type indicating supplementary index information for the index; and a third type indicating a value corresponding to the key.

8. The storage device of claim 1, wherein the controller is configured to provide a list of free zone clusters in an erased state and after executing an erase operation on the target zone cluster, add the target zone cluster to the list of free zone clusters.

9. A method of operating a storage device comprising a plurality of zones, the method comprising:
grouping the plurality of zones into a plurality of zone clusters;
determining a seed value for the each of the plurality of zone clusters as a random value at a time the plurality of zone clusters is grouped,
selecting a target zone cluster from among the plurality of zone clusters;
determining a target zone among zones included in the target zone cluster based on a write count for the target zone cluster and a seed value for the target zone cluster; and
storing target data in the target zone.

10. The method of claim 9, wherein the target data is arranged and stored in the target zone cluster as a part of a data chunk, the data chunk including a plurality of data units, wherein each of the plurality of data units includes a key and a value corresponding to the key.

11. The method of claim 9, wherein the write count increases whenever data of a unit size is written to the target zone cluster.

12. The method of claim 9, wherein determining the target zone comprises dividing a sum of the write count and the seed value by a number of zones included in the target zone cluster.

13. The method of claim 9, wherein storing the target data comprises writing the target data into a location indicated by a write pointer that points to the target zone.

14. The method of claim 13, wherein the target data is data of a type that is one of a plurality of data types.

15. The method of claim 9, further comprising:
executing an erase operation on the target zone cluster; and
after the target zone cluster is erased, adding the target zone cluster to a list of free zone clusters in an erased state.

16. A system comprising:

a storage device including a plurality of zones; and a host coupled to the storage device and configured to control storage of target data in the storage device, wherein the target data includes a plurality of data units, each data unit comprising a key-value pair, wherein the storage device is configured to group the plurality of zones into a plurality of zone clusters, configured to determine a seed value for the each of the plurality of zone clusters as a random value at a time the plurality of zone clusters is grouped, configured to determine a target zone among zones included in a target zone cluster among the plurality of zone clusters based on a write count for the target zone cluster and a seed value for the target zone cluster, and store the target data in the target zone.

17. The system of claim 16, wherein the storage device is configured to increment the write count whenever data of a unit size is written to the target zone cluster.

18. The system of claim 16, wherein the storage device is configured to determine the target zone based on a remainder obtained by dividing a sum of the write count and the seed value, by a number of zones included in the target zone cluster.

* * * * *